US008311889B1

(12) United States Patent
Lagle Ruiz et al.

(10) Patent No.: US 8,311,889 B1
(45) Date of Patent: *Nov. 13, 2012

(54) IMAGE CONTENT AND QUALITY ASSURANCE SYSTEM AND METHOD

(75) Inventors: Kristen Lagle Ruiz, Mountain View, CA (US); Chris Waterson, Incline Village, NV (US); James R. Everingham, Santa Cruz, CA (US)

(73) Assignee: Luminate, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,443

(22) Filed: Jul. 10, 2012

Related U.S. Application Data (63) Continuation of application No. 13/450,807, filed on Apr. 19, 2012, now Pat. No. 8,234,168.

(51) Int. Cl.
*G06Q 30/00* (2012.01)
(52) U.S. Cl. .................................................. 705/14.64
(58) Field of Classification Search .................... 795/14
See application file for complete search history.

(56) References Cited

U.S. PATENT DOCUMENTS

| | | |
|---|---|---|
| D297,243 S | 8/1988 | Wells-Papanek et al. |
| 4,789,962 A | 12/1988 | Berry et al. |
| 5,008,853 A | 4/1991 | Bly et al. |
| 5,199,104 A | 3/1993 | Hirayama |
| 5,287,448 A | 2/1994 | Nicol et al. |
| 5,349,518 A | 9/1994 | Zifferer et al. |
| 5,367,623 A | 11/1994 | Iwai et al. |
| 5,428,733 A | 6/1995 | Carr |
| 5,583,655 A | 12/1996 | Tsukamoto et al. |
| 5,589,892 A | 12/1996 | Knee et al. |
| 5,615,367 A | 3/1997 | Bennett et al. |
| 5,627,958 A | 5/1997 | Potts et al. |
| D384,050 S | 9/1997 | Kodosky |
| D384,052 S | 9/1997 | Kodosky |
| 5,682,469 A | 10/1997 | Linnett et al. |
| 5,684,716 A | 11/1997 | Freeman |
| 5,689,669 A | 11/1997 | Lynch et al. |
| 5,706,507 A | 1/1998 | Schloss |
| 5,721,906 A | 2/1998 | Siefert |
| 5,724,484 A | 3/1998 | Kagami et al. |
| 5,754,176 A | 5/1998 | Crawford |
| 5,796,932 A | 8/1998 | Fox et al. |
| D406,828 S | 3/1999 | Newton et al. |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Colleen Hoar
(74) *Attorney, Agent, or Firm* — Marcus T. Hunt; Bozicevic, Field & Francis LLP (57) ABSTRACT

Disclosed herein are computer-implement systems and methods for identifying and analyzing content (e.g., text, images, videos, etc.) published on digital content platforms (e.g., webpages, mobile applications, etc.). Such analysis is then used to determine whether the published content is appropriate for association with (or "hosting of") a third-party's content. In one embodiment, for example, the systems and methods presented are particularly useful for determining the appropriateness of an image published on a digital content platform, prior to providing an advertisement proximate the image. As such, merchants can avoid associating their advertised products/services with vulgar, obscene, or otherwise inappropriate images that may have a negative impact on their brand or reputation.

30 Claims, 7 Drawing Sheets

U.S. PATENT DOCUMENTS

| | | | |
|---|---|---|---|
| 5,933,138 A | 8/1999 | Driskell | |
| 5,956,029 A | 9/1999 | Okada et al. | |
| 6,026,377 A | 2/2000 | Burke | |
| 6,034,687 A | 3/2000 | Taylor et al. | |
| D427,576 S | 7/2000 | Coleman | |
| 6,285,381 B1 | 9/2001 | Sawano et al. | |
| D450,059 S | 11/2001 | Itou | |
| 6,414,679 B1 | 7/2002 | Miodonski et al. | |
| D469,104 S | 1/2003 | Istvan et al. | |
| 6,728,752 B1 | 4/2004 | Chen et al. | |
| D528,552 S | 9/2006 | Nevill-Manning | |
| D531,185 S | 10/2006 | Cummins | |
| 7,117,254 B2 | 10/2006 | Lunt et al. | |
| 7,124,372 B2 | 10/2006 | Brin | |
| 7,159,185 B1 | 1/2007 | Vedula et al. | |
| 7,231,395 B2 | 6/2007 | Fain et al. | |
| 7,233,316 B2 | 6/2007 | Smith et al. | |
| 7,251,637 B1 | 7/2007 | Caid et al. | |
| D553,632 S | 10/2007 | Harvey et al. | |
| D555,661 S | 11/2007 | Kim | |
| D557,275 S | 12/2007 | De Mar et al. | |
| D562,840 S | 2/2008 | Cameron | |
| D566,716 S | 4/2008 | Rasmussen et al. | |
| D567,252 S | 4/2008 | Choe et al. | |
| D577,365 S | 9/2008 | Flynt et al. | |
| 7,437,358 B2 | 10/2008 | Arrouye et al. | |
| 7,502,785 B2 | 3/2009 | Chen et al. | |
| D590,412 S | 4/2009 | Saft et al. | |
| 7,519,200 B2 | 4/2009 | Gokturk et al. | |
| 7,519,595 B2 | 4/2009 | Solaro et al. | |
| 7,542,610 B2 | 6/2009 | Gokturk et al. | |
| 7,558,781 B2 | 7/2009 | Probst et al. | |
| D600,704 S | 9/2009 | LaManna et al. | |
| D600,706 S | 9/2009 | LaManna et al. | |
| 7,599,938 B1* | 10/2009 | Harrison, Jr. | 705/7.29 |
| 7,657,100 B2 | 2/2010 | Gokturk et al. | |
| 7,657,126 B2 | 2/2010 | Gokturk et al. | |
| 7,660,468 B2 | 2/2010 | Gokturk et al. | |
| D613,299 S | 4/2010 | Owen et al. | |
| D613,750 S | 4/2010 | Truelove et al. | |
| D614,638 S | 4/2010 | Viegers et al. | |
| 7,760,917 B2 | 7/2010 | Vanhoucke et al. | |
| 7,783,135 B2 | 8/2010 | Gokturk et al. | |
| 7,792,818 B2 | 9/2010 | Fain et al. | |
| D626,133 S | 10/2010 | Murphy et al. | |
| 7,809,722 B2 | 10/2010 | Gokturk et al. | |
| D629,411 S | 12/2010 | Weir et al. | |
| D638,025 S | 5/2011 | Saft et al. | |
| D643,044 S | 8/2011 | Ording | |
| 8,027,940 B2* | 9/2011 | Li et al. | 706/12 |
| 8,036,990 B1 | 10/2011 | Mir et al. | |
| 8,055,688 B2 | 11/2011 | Giblin | |
| 8,060,161 B2 | 11/2011 | Kwak | |
| D652,424 S | 1/2012 | Cahill et al. | |
| 8,166,383 B1 | 4/2012 | Everingham et al. | |
| 8,234,168 B1 | 7/2012 | Lagle Ruiz et al. | |
| D664,976 S | 8/2012 | Everingham | |
| D664,977 S | 8/2012 | Everingham | |
| 8,255,495 B1 | 8/2012 | Lee | |
| 2002/0065844 A1 | 5/2002 | Robinson et al. | |
| 2003/0050863 A1 | 3/2003 | Radwin | |
| 2003/0220912 A1 | 11/2003 | Fain et al. | |
| 2004/0070616 A1 | 4/2004 | Hildebrandt et al. | |
| 2005/0251760 A1 | 11/2005 | Sato et al. | |
| 2006/0155684 A1 | 7/2006 | Liu et al. | |
| 2006/0265400 A1 | 11/2006 | Fain et al. | |
| 2007/0118520 A1 | 5/2007 | Bliss et al. | |
| 2007/0157119 A1 | 7/2007 | Bishop | |
| 2007/0203903 A1 | 8/2007 | Attaran Rezaei et al. | |
| 2007/0219968 A1 | 9/2007 | Frank | |
| 2007/0258646 A1 | 11/2007 | Sung et al. | |
| 2008/0079696 A1 | 4/2008 | Shim et al. | |
| 2008/0082426 A1 | 4/2008 | Gokturk et al. | |
| 2008/0134088 A1 | 6/2008 | Tse et al. | |
| 2008/0141110 A1 | 6/2008 | Gura | |
| 2008/0163379 A1 | 7/2008 | Robinson et al. | |
| 2008/0177640 A1 | 7/2008 | Gokturk et al. | |
| 2008/0199075 A1 | 8/2008 | Gokturk et al. | |
| 2008/0208849 A1 | 8/2008 | Conwell | |
| 2008/0268876 A1 | 10/2008 | Gelfand et al. | |
| 2009/0006375 A1 | 1/2009 | Lax et al. | |
| 2009/0007012 A1 | 1/2009 | Mandic et al. | |
| 2009/0125544 A1 | 5/2009 | Brindley | |
| 2009/0144392 A1 | 6/2009 | Wang et al. | |
| 2009/0148045 A1 | 6/2009 | Lee et al. | |
| 2009/0158146 A1 | 6/2009 | Curtis et al. | |
| 2009/0159342 A1 | 6/2009 | Markiewicz et al. | |
| 2009/0165140 A1 | 6/2009 | Robinson et al. | |
| 2009/0228838 A1 | 9/2009 | Ryan et al. | |
| 2009/0287669 A1 | 11/2009 | Bennett | |
| 2010/0005001 A1 | 1/2010 | Aizen et al. | |
| 2010/0077290 A1 | 3/2010 | Pueyo | |
| 2010/0260426 A1 | 10/2010 | Huang et al. | |
| 2010/0312596 A1 | 12/2010 | Saffari et al. | |
| 2010/0313143 A1 | 12/2010 | Jung et al. | |
| 2011/0022958 A1 | 1/2011 | Kang et al. | |
| 2011/0072047 A1* | 3/2011 | Wang et al. | 707/776 |
| 2011/0087990 A1 | 4/2011 | Ng et al. | |
| 2011/0131537 A1 | 6/2011 | Cho et al. | |
| 2011/0138300 A1 | 6/2011 | Kim et al. | |
| 2011/0164058 A1 | 7/2011 | Lemay | |
| 2011/0173190 A1 | 7/2011 | van Zwol et al. | |
| 2011/0184814 A1 | 7/2011 | Konkol et al. | |
| 2011/0196863 A1 | 8/2011 | Marcucci et al. | |
| 2011/0243459 A1* | 10/2011 | Deng | 382/218 |
| 2011/0280447 A1* | 11/2011 | Conwell | 382/103 |
| 2011/0296339 A1 | 12/2011 | Kang | |
| 2012/0005209 A1 | 1/2012 | Rinearson et al. | |
| 2012/0036132 A1 | 2/2012 | Doyle | |
| 2012/0054355 A1 | 3/2012 | Arrasvuori et al. | |

OTHER PUBLICATIONS

Everingham et al., "Hello! My name is . . . Buffy'—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web/20100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

* cited by examiner

FIG. 7 ical and scientific terms used herein have the same meaning as commonly understood by one of ordinary skill in the art to which this invention belongs.

IMAGE CONTENT AND QUALITY ASSURANCE SYSTEM AND METHOD

CROSS-REFERENCE TO RELATED APPLICATIONS

This application is a continuation of U.S. patent application Ser. No. 13/450,807, filed on Apr. 19, 2012, which is incorporated herein by reference in its entirety.

SUMMARY

Disclosed herein are computer-implement systems and methods for identifying and analyzing content (e.g., text, images, videos, etc.) published on digital content platforms (e.g., webpages, mobile applications, etc.). Such analysis is then used to determine whether the published content is appropriate for association with (or "hosting of") a third-party's content. In one embodiment, for example, the systems and methods presented are particularly useful for determining the appropriateness of an image published on a digital content platform, prior to providing an advertisement proximate the image. As such, merchants can avoid associating their advertised products/services with vulgar, obscene, or otherwise inappropriate images that may have a negative impact on their brand or reputation.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DEFINITIONS

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

"Advertisement" or "ad": One or more images, with or without associated text, to promote or display a product or service. Terms "advertisement" and "ad," in the singular or plural, are used interchangeably.

"Ad Creative" or "Creative": Computer file with advertisement, image, or any other content or material related to a product or service. As used herein, the phrase "providing an advertisement" may include "providing an ad creative," where logically appropriate. Further, as used herein, the phrase "providing a contextually relevant advertisement" may include "providing an ad creative," where logically appropriate.

Ad server: One or more computers, or equivalent systems, which maintains a catalog of creatives, delivers creative(s), and/or tracks advertisement(s), campaigns, and/or campaign metrics independent of the platform where the advertisement is being displayed.

Campaign: The process or program of planning, creating, buying, and/or tracking an advertising project.

"Contextual information" or "contextual tag": Data related to the contents and/or context of digital content (e.g., an image, or content within the image); for example, but not limited to, a description, identification, index, or name of an image, or object, or scene, or person, or abstraction within the digital content (e.g., image).

Contextually relevant advertisement: A targeted advertisement that is considered relevant to the contents and/or context of digital content on a digital content platform.

Crowdsource network: One or more individuals, whether human or computer, used for a crowdsourcing application.

Crowdsourcing: The process of delegating a task to one or more individuals, with or without compensation.

Digital content: Broadly interpreted to include, without exclusion, any content available on a digital content platform, such as images, videos, text, audio, and any combinations and equivalents thereof.

Digital content platform: Broadly interpreted to include, without exclusion, any webpage, website, browser-based web application, software application, mobile device application (e.g., phone or tablet application), TV widget, and equivalents thereof.

Image: A visual representation of an object, or scene, or person, or abstraction, in the form of a machine-readable and/or machine-storable work product (e.g., one or more computer files storing a digital image, a browser-readable or displayable image file, etc.). As used herein, the term "image" is merely one example of "digital content." Further, as used herein, the term "image" may refer to the actual visual representation, the machine-readable and/or machine-storable work product, location identifier(s) of the machine-readable and/or machine-storable work product (e.g., a uniform resource locator (URL)), or any equivalent means to direct a computer-implemented system and/or user to the visual representation. As such, process steps performed on "an image" may call for different interpretations where logically appropriate. For example, the process step of "analyzing the context of an image," would logically include "analyzing the context of a visual representation." However, the process step of "storing an image on a server," would logically include "storing a machine-readable and/or machine-storable work product, or location identifier(s) of the machine-readable and/or machine-storable work product (e.g., uniform resource locator (URL)) on a server." Further, process steps performed on an image may include process steps performed on a copy, thumbnail, or data file of the image.

Merchant: Seller or provider of a product or service; agent representing a seller or provider; or any third-party charged with preparing and/or providing digital content associated with a product or service. For example, the term merchant should be construed broadly enough to include advertisers, an ad agency, or other intermediaries, charged with developing a digital content to advertise a product or service.

Proximate: Is intended to broadly mean "relatively adjacent, close, or near," as would be understood by one of skill in the art. The term "proximate" should not be narrowly construed to require an absolute position or abutment. For example, "content displayed proximate to an image," means "content displayed relatively near an image, but not necessarily abutting or within the image." (To clarify: "content displayed proximate to an image," also includes "content displayed abutting or within the image.") In another example, "content displayed proximate to an image," means "content displayed on the same screen page or webpage as the image."

Publisher: Party that owns, provides, and/or controls digital content or a digital content platform; or third-party who provides, maintains, and/or controlls, digital content and/or ad space on a digital content platform.

INCORPORATION BY REFERENCE OF RELATED APPLICATIONS

Except for any term definitions that conflict with the term definitions provided herein, the following related, co-owned, and co-pending applications are incorporated by reference in their entirety: U.S. patent application Ser. Nos. 12/902,066; 13/005,217; 13/005,226; 13/045,426; 13/151,110; 13/219,460; 13/252,053; 13/299,280; 13/308,401; 13/299,280; and 13/427,341.

DETAILED DESCRIPTION

Disclosed herein are computer-implement systems and methods for identifying and analyzing content (e.g., text, images, videos, etc.) published on digital content platforms (e.g., webpages, mobile applications, etc.). Such analysis is then used to determine whether the published content is appropriate for association with (or "hosting of") a third-party's content.

In one embodiment, for example, the computer-implement systems and methods disclosed herein are used for identifying and analyzing the context/content within images published on digital content platforms. The context/content of an image is then used to determine whether the image is appropriate for association with (or "hosting of") of a third-party's content. The systems and methods presented are particularly useful for third-parties (e.g., merchants and/or content developers) to analyze the appropriateness of published images, and thereby avoid associating their content (e.g., products, advertisements, in-image applications, etc.), on the digital content platform, with vulgar, obscene, or otherwise inappropriate images. However, if an image is deemed appropriate for association with the third-party's content, then a third-party's content is matched/linked to the image, and provided to the digital content platform for publication proximate to the image. As such, third-parties can be assured that their content is being associated with (or "hosted by") quality images that will not have a negative impact on their brand or reputation. The systems and methods disclosed herein can also be used to track and score publishers, and thereby identify publishers best-suited to host third-party content.

For example, in one embodiment, there is provided a computer-implemented system and method for a service provider to identify images eligible for hosting advertisements on a digital content platform. The embodiment includes using a computer-implemented image collection system to (1) identify an image published on a digital content platform, and (2) identify a publisher of the image. The embodiment further includes using a computer-implemented image analysis system to assess the context/content within the image. If the image analysis system determines that the image is eligible (or otherwise appropriate) for hosting advertisements, then the image is automatically submitted to an image-advertisement matching engine, wherein the image is linked to an advertisement. The advertisement is then sent to the digital content platform for publication proximate to the image. However, if the image analysis system determines that the image is ineligible (or otherwise inappropriate) for hosting advertisements, then the image is flagged as ineligible and is automatically submitted for relationship test analysis. A relationship test analysis is then performed to assess whether the image and/or publisher is in violation a pre-defined, service provider terms of service. A publisher "trust score" is maintained and updated based on the image analysis and/or the relationship test analysis.

Figure 1:
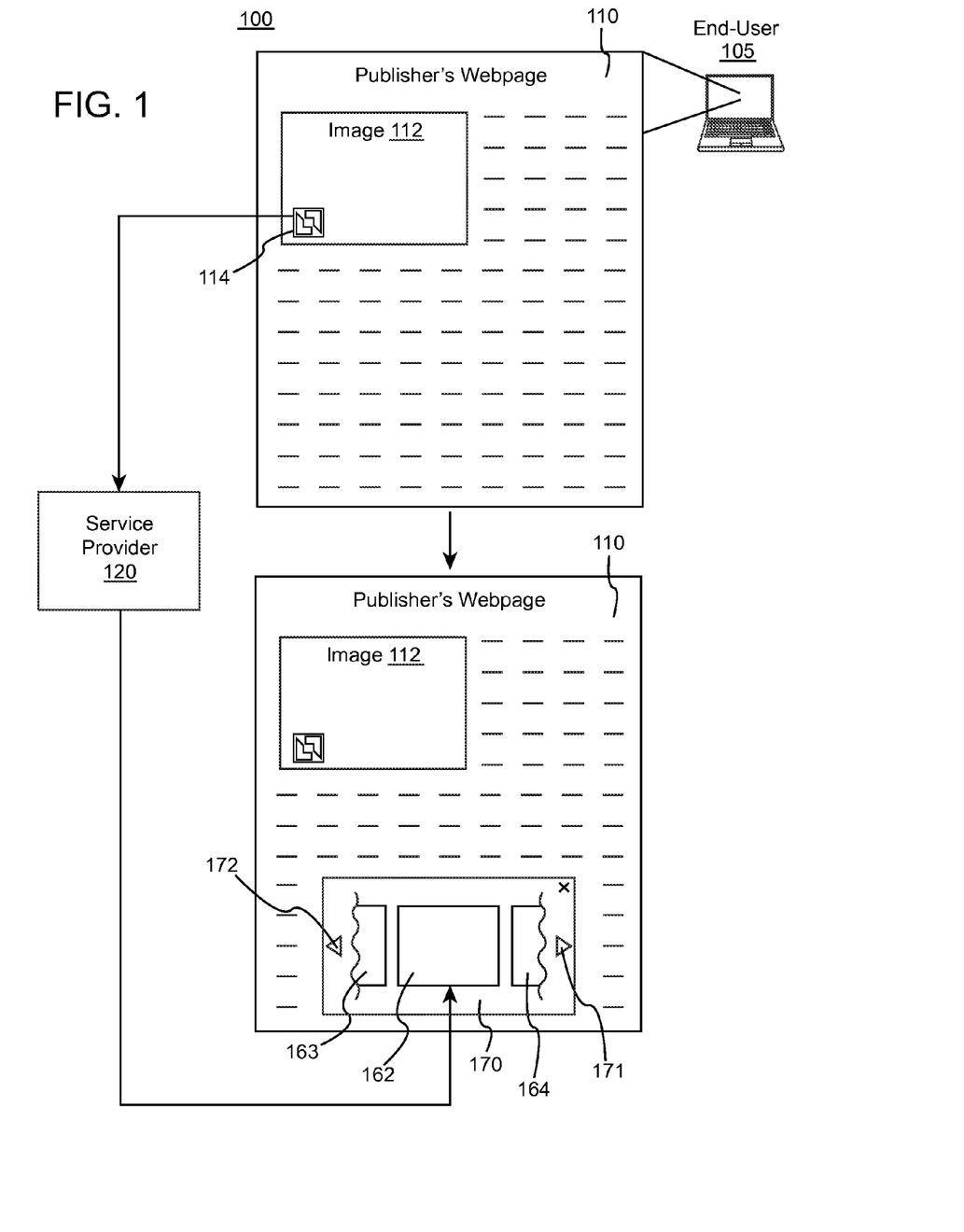
FIG. 1 is a high-level diagram illustrating an example use-case for the present invention.
Figure 2:
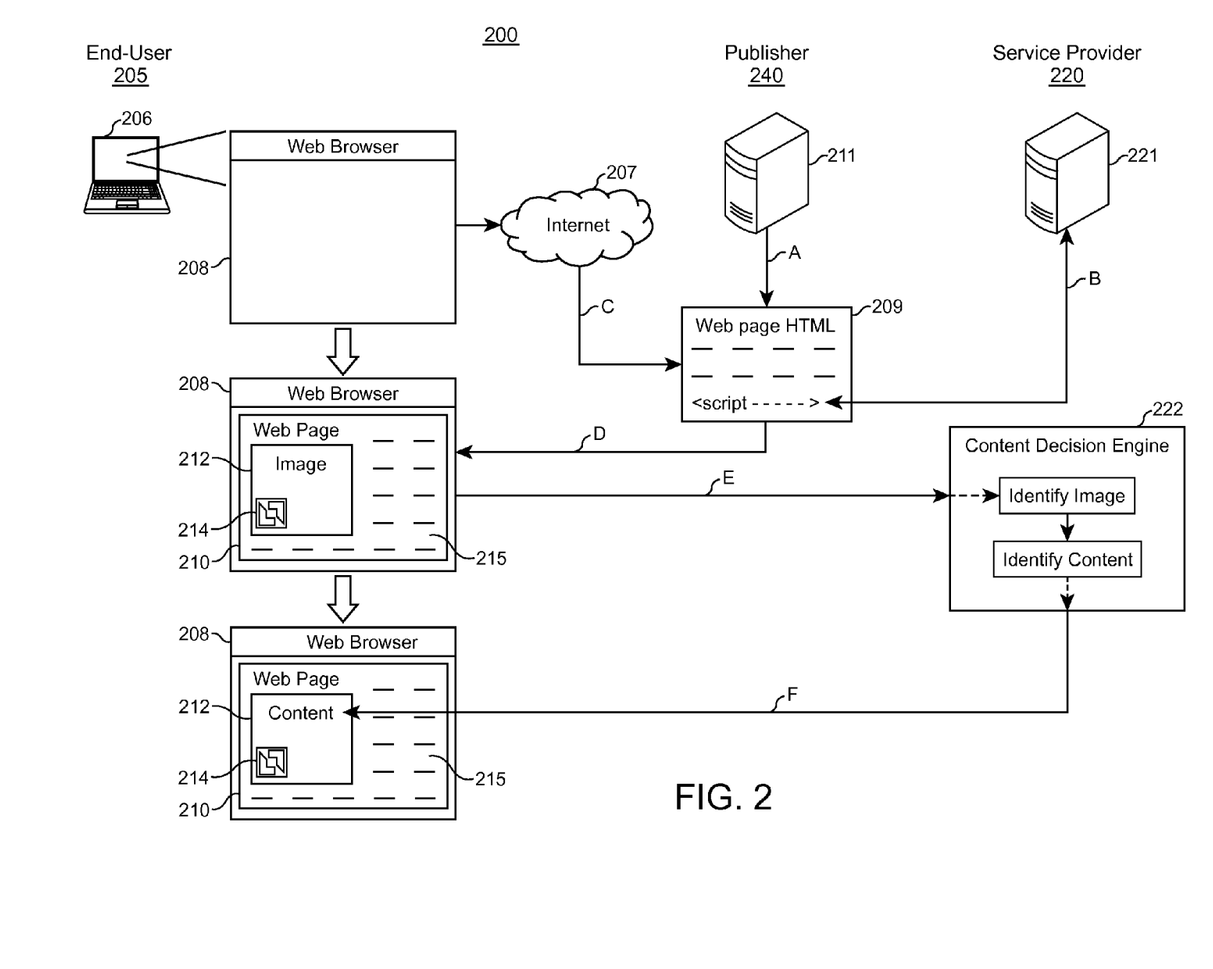
FIG. 2 is a high-level diagram illustrating another example use-case for the present invention.
Figure 3:
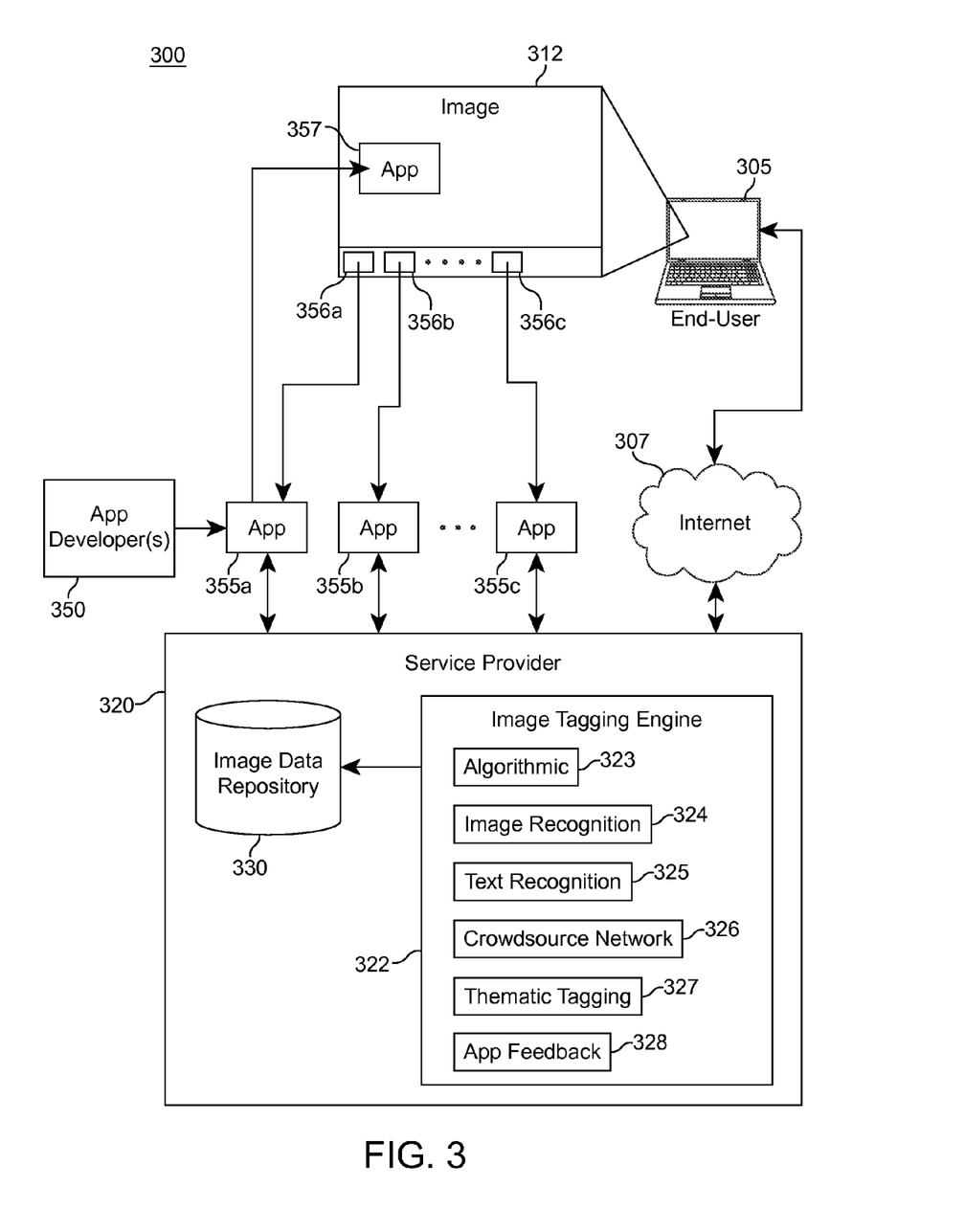
FIG. 3 is a high-level diagram illustrating yet another example use-case for the present invention.
Figure 4:
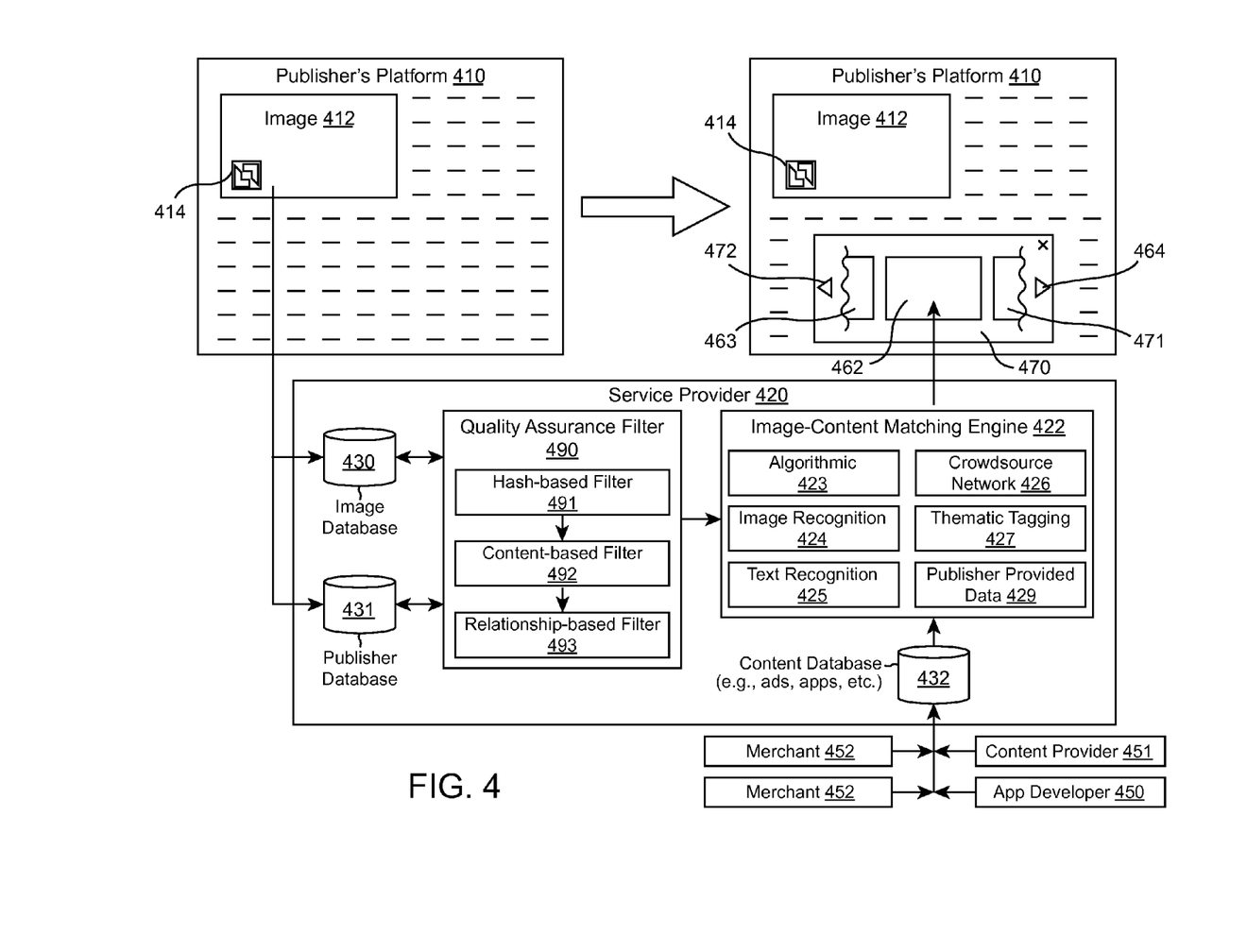
FIG. 4 is a high-level schematic diagram of an embodiment of the present invention.
Figure 5:
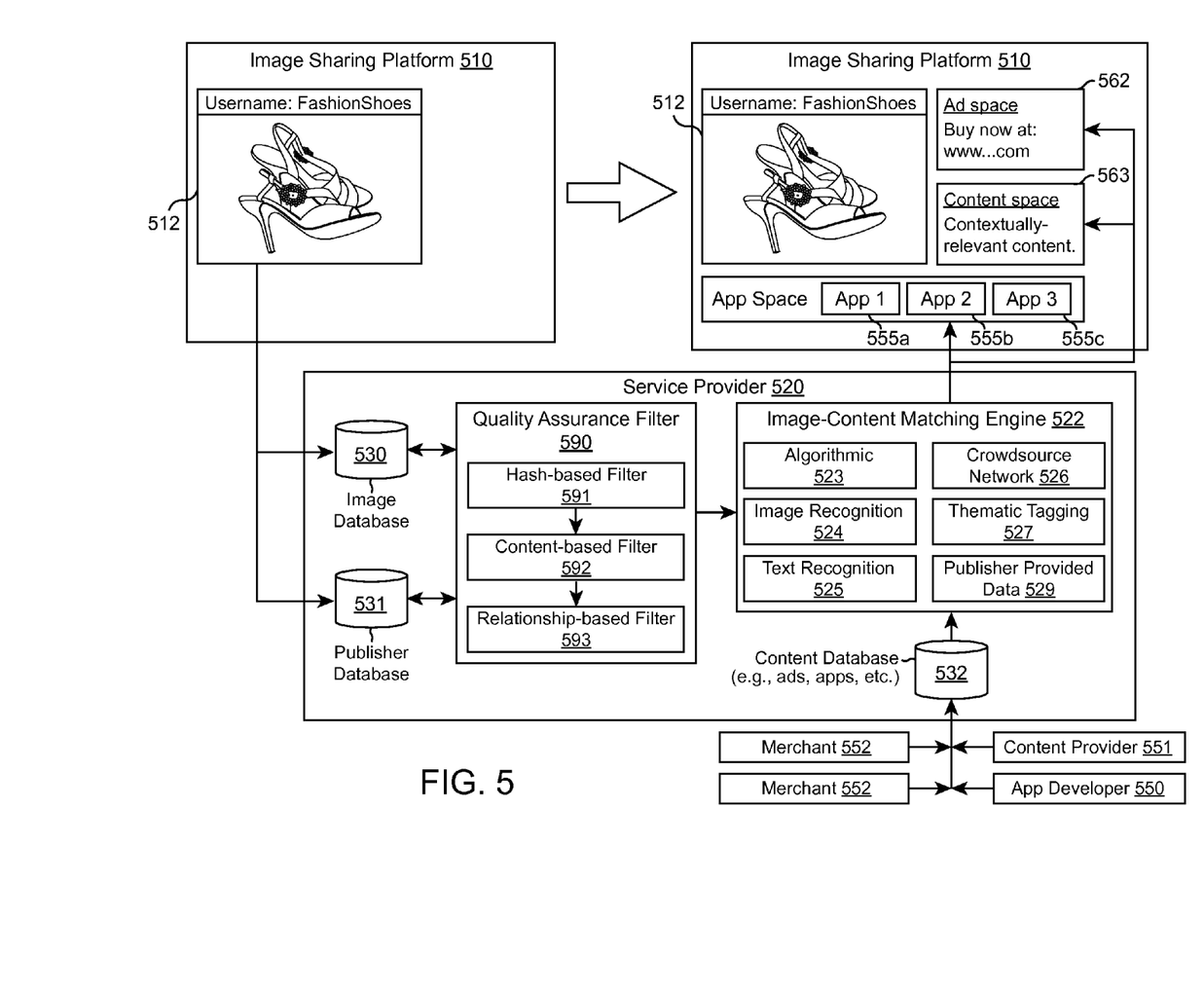
FIG. 5 is a high-level schematic diagram of another embodiment of the present invention.
Figure 6:
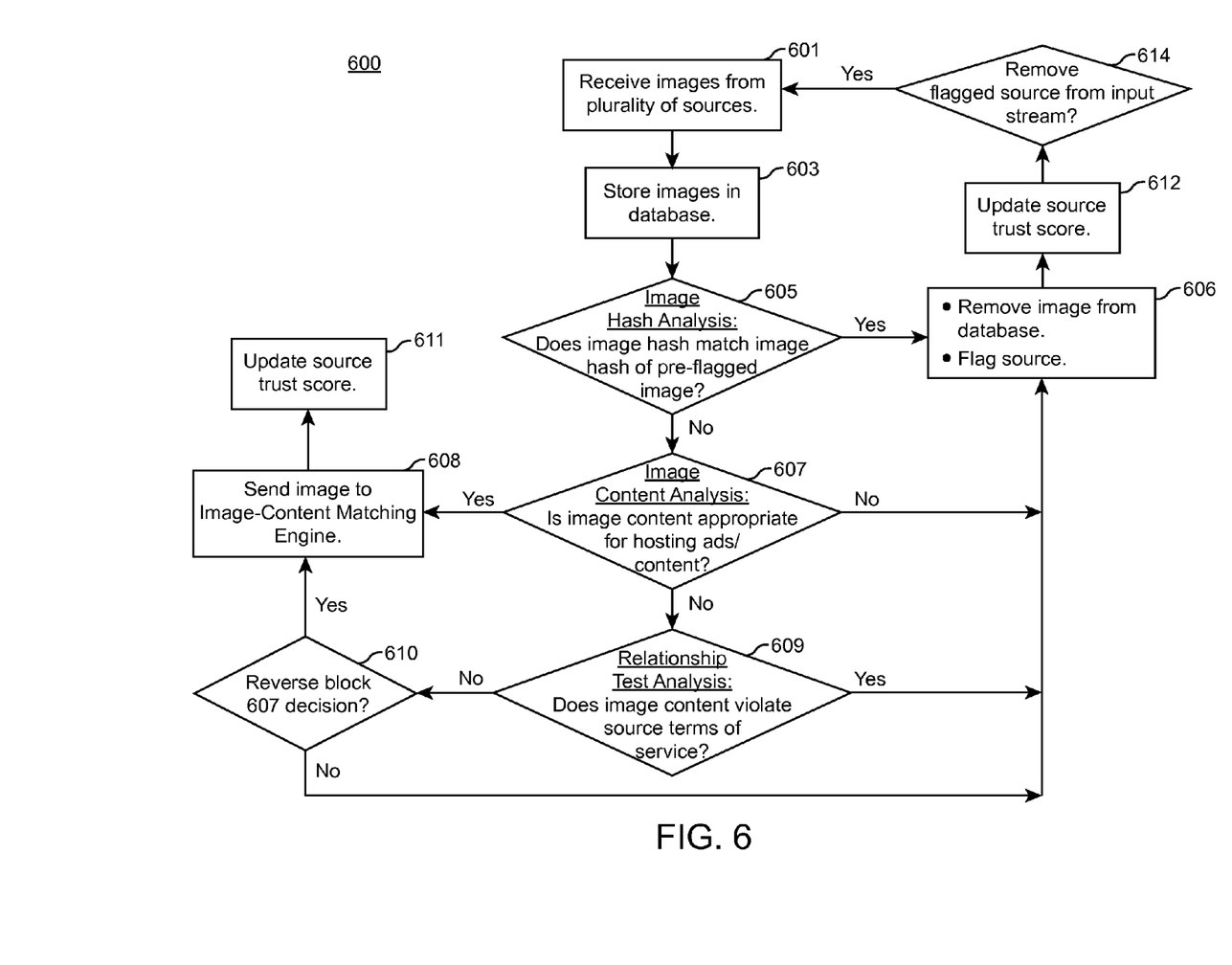
FIG. 6 is a flowchart illustrating a method, in accordance with one embodiment presented herein.

Additional embodiments and sub-protocols are described in more detail below. However, prior to describing such additional embodiments, FIGS. 1-3 are presented to illustrate three example use-cases for the systems and methods presented. As will be clear upon review of FIGS. 1-3, merchants and/or content providers will benefit from a scalable and automated system to ensure the quality and/or appropriateness of published images, before they associate their content with the published image via implementation of the various use-cases. FIGS. 4-6, and the additional embodiments presented, outline examples of scalable and automated mechanisms for filtering out inappropriate images, and/or otherwise ensuring the quality and/or appropriateness of published images prior to using the published images to host additional content.

For example, FIG. 1 is a high-level diagram illustrating an example use-case 100, for an embodiment of the present invention. Similar systems and methods are discussed in greater detail in the above-referenced related applications; for example, U.S. patent application Ser. Nos. 13/252,053 and 13/299,280. As shown in FIG. 1, an image 112 is originally published on a publisher's webpage 110. When an end-user 105 accesses the webpage 110 and activates a hotspot 114, a call is made upon a service provider 120 to provide contextually relevant content (e.g., one or more ad creatives 162, 163, and 164) within an image frame 170 provided proximate to the image 112. The end-user 105 can then use interfaces 171 and 172 to browse amongst ad creatives (or any digital content otherwise provided) 162, 163, and 164. In practice, the service provider 120 implements any of a variety of image-content matching algorithms and systems to identify and provide contextually relevant ad creatives 162, 163, and/or 164. Such image-content matching algorithms and systems are described in more detail below, as well as in the above-referenced related applications.

In one embodiment, the ad creatives 162, 163, and/or 164 are contextually related to each other, to the image 112, and/or to the rest of the digital content on the webpage 110. The image frame 170 may be used as a means for the end-user 105 to browse ad creatives on the webpage 110, without having to leave the webpage 110. Further, each ad creative within the image frame 170 may provide a link to another webpage, such as a merchant's webpage. As such, the image frame 170 may provide a means for a merchant to display advertisements that are contextually relevant to the image 112, digital content on the webpage 110, and/or other images displayed within the image frame 170. However, if the image 112 (or any of the other digital content on the webpage 110) is vulgar, obscene, or otherwise inappropriate for association with the merchant's ads, the systems and methods presented herein can be used to flag the image 112 (and/or publisher) and avoid association (or publication) of the merchant's ads with the image 112.

FIG. 2 is a high-level diagram illustrating another example use-case 200, for an embodiment of the present invention. Similar systems and methods are discussed in greater detail in the above-referenced related applications; for example, U.S. patent application Ser. No. 13/427,341. In FIG. 2, arrows A-F illustrate the process flow of use-case 200. Of note, FIG. 2 is illustrated and described with relation to a digital content platform in the form of a webpage. However, as would be understood by one of skill in the art, the use-case 200 is applicable to alternative and equivalent digital content platforms, such as, browser-based web applications, software applications, mobile device applications (e.g., phone or tablet applications), TV widgets, and equivalents thereof.

In operation, a publisher 240 prepares, publishes, and maintains an HTML webpage script 209 on a server 211 (Arrow A). The publisher 240 also inserts a reference script, which serves as a redirect to a dedicated content server 221 maintained by a service provider 220 (Arrow B). An end-user 205 employs an end-user device 206 (e.g., computer, mobile device, tablet, etc.) and web browser 208 (or alternatively a mobile application, i.e., "app") to access the HTML webpage script 209 via the Internet 207 (Arrow C). The user's web browser 208 loads the HTML webpage script 209 as a viewable webpage 210 within the web browser 208. The webpage 210 may include content such as image(s) 212 and text 215. The image 212 may include one or more hotspots 214, or other means of activating the image. In one embodiment, the image 212 is not originally published with a hotspot 214, but instead has a hotspot activated after the service provider 220 has identified and analyzed the image, and/or the end-user 205 "mouses-over" the image.

Arrow E indicates the reference script calling to the service provider 220, and more specifically to a content decision engine 222 maintained by the service provider, in order for the service provider to identify the image and identify content that is contextually relevant to the image. Such contextually relevant content (e.g., contextually relevant advertisements) is then returned to the end-user device 206 for display within the web browser 208, as shown by Arrow F. In one embodiment, the contextually relevant content is shown within the same pixel frame (or pixel profile) as the originally published image 212. However, the contextually relevant content can be published anywhere proximate to image 212.

As with use-case 100, if the image 212 (or any of the other content on the webpage 210) is vulgar, obscene, or otherwise inappropriate for association with the available contextually relevant content, the systems and methods presented herein can be used to flag the image 212 (and/or the publisher 240) and avoid association (or publication) of contextually relevant content with the image 212, webpage 210, and/or publisher 240.

FIG. 3 is a high-level diagram illustrating yet another example use-case 300, for an embodiment of the present invention. Similar systems and methods are discussed in greater detail in the above-referenced related applications; for example U.S. patent application Ser. No. 13/308,401. More specifically, FIG. 3 illustrates a system 300 for facilitating the enablement, activation, and/or rendering of interactive applications (or "apps") proximate to digital content published on a digital content platform (e.g., an image published on a webpage). As shown, an end-user 305 accesses a digital content platform (e.g., a webpage, mobile application, etc.) through an Internet connection 307. Typically, digital content, such as an image 312, published or otherwise displayed on a webpage, is static and provides limited interactivity with the end-user 305. However, the systems and methods presented provide an opportunity to make the image 312 interactive, host additional content relevant to the image, and/or create "online real estate" for providing contextually relevant advertisements. In other words, system 300 provides a platform for providing interactive content and/or applications for the end-user 305, relevant to the published digital content (i.e., the image 312).

As shown in FIG. 3, one or more application developer(s) 350 may provide one or more interactive applications 355a, 355b, 355c, for enablement, activation, and rendering on published digital content (e.g., the image 312). In practice, applications 355a, 355b, and/or 355c can be enabled by the application developer 350, a service provider 320, and/or the publisher of the digital content. Enablement of the applications provides the end-user 305 with a palette of applications to choose from. In the example shown in FIG. 3, the end-user 305 can then activate one or more of the enabled applications by selecting a respective icon or hotspot 356a, 356b, 356c on the image 312. User-activation of the selected application then pulls image data available for the image 312 in order to render an in-image interactive application 357, proximate to the image. (The use of the term "in-image" should not be interpreted to require a fixed positional relationship between the image and the application. For example, in one embodiment, an "in-image application" may be rendered proximate to the image; i.e., inside or outside the image boundary/frame, near the image, on the same screen as the image, on the same webpage as the image; or any other equivalent position relative to the image.)

In order for the enablement, activation, and/or rendering of the in-image application to be relevant to the image, the application developer(s) 350 may require detailed contextual information (or data) on the contents/context of the image 312. In practice, the contextual data is provided by the service provider 320. More specifically, the service provider 320 implements various interfaces and sub-protocols to identify published content, analyze the content, index and maintain the data available on the content, and provide contextual data to the enabled and activated applications 355a, 355b, and 355c. For example, the service provider 320 can pull digital images published on webpages, and process the images through an image tagging engine 322. Within the image tagging engine 322, the service provider 320 employs techniques such as: algorithmic identification 323 or analysis of the image; image recognition protocols 324 and analysis of the image; proximate text recognition 325 in search of contextual information of the image based on text published proximate to the image; submission of the image to a crowdsource network 326 to identify the context of the image and tag the image with relevant data; a thematic tagging engine 327 to identify and tag the image with relevant data, based on a pre-defined theme; an application feedback engine 328 to receive use-feedback from an enabled, activated, and rendered application; and/or any combinations or equivalents thereof. Information/data obtained or developed respective to the image is then stored in an image data repository 330. In one embodiment, the image data is indexed within image data repository 330 via a unique image key, uniform resource locator (URL), or equivalents thereof. As such, inquiries and/or searches upon image data repository 330 may quickly and effectively provide all relevant data available for use in an interactive in-image application.

As with use-cases 100 and 200, if the image 312 is vulgar, obscene, or otherwise inappropriate for association with the applications 355a, 355b, or 355c, the systems and methods presented herein can be used to flag the image 312 (and/or the publisher of the image) and avoid association (or enablement/activation/publication) of the applications 355a, 355b, or 355c with the image 312.

FIG. 4 is a high-level schematic diagram of an embodiment of the present invention. As will be described with reference to FIG. 4, an image 412, which is received from a publisher's platform 410, is first processed through a quality assurance filter 490, before being processed through an image-content matching engine 422. As such, inappropriate images can be removed from consideration or matching with any contextually relevant content 432 provided by app developer(s) 450, content provider(s) 451, and/or merchant(s) 452.

More specifically, FIG. 4 shows an embodiment wherein a service provider 420 analyzes an image 412 published on a digital content platform 410. In practice, the image 412 is received and stored within an image database 430. Of note, an actual copy of the image 412 need not be stored into the image database 430. For example, the image database 430 can be used to capture and store metadata around the image 412, a URL link of the image, post-processing metadata associated with the image, a thumbnail of the image, an image hash of the image, or any equivalent means for identifying, viewing, or processing of the image. Publisher data is also received from the digital content platform 410, and stored in a publisher database 431.

Image collection (or "capture") procedures include: scraping images from the digital content platform 410; a web crawling robot; computer code for "walking the DOM tree"; a computerized "widget" to automatically queue images when the webpages are first loaded; an interface for a publisher to submit published images; and/or any combinations or equivalents thereof. The "collecting" or "capturing" of images broadly includes the identifying of, making a copy of, and/or saving a copy of the image (or associated data) into image database 430. The "collecting" or "capturing" of images may also broadly include identifying image locations (e.g., image URLs) such that the images need not be stored temporarily or permanently in image database 430, but may still be accessed when needed.

Within image database 430, the images 412 (or image identifiers) may be cataloged, categorized, sub-categorized, and/or scored based on image metadata and/or existing image tags. In one embodiment, the scoring may be based on data obtained from the digital content platform 410 that published the image 412. The data may be selected from the group consisting of: image hash, digital publisher identification, publisher priority, image category, image metadata, quality of digital image, size of digital image, date of publication of the digital image, time of publication of digital image, image traffic statistics, and any combination or equivalents thereof. The images 412 may also be tagged with the location of origin of the image. The image 412 may also be thumb-nailed, resized, or otherwise modified to optimize processing.

In one embodiment, image database 430 is maintained by the service provider 420. Alternatively, the service provider 420 need not maintain, but only have access to, the image database 430. The images within image database 430 (e.g., the image 412) are then processed, by the service provider 420, through a quality assurance filter 490 and an image-content matching engine 422.

In the embodiment shown, the quality assurance filter 490 includes one or more sub-protocols, such as: hash-based filter 491, content-based filter 492, and/or relationship-based filter 493. Within hash-based filter 491, an image hash analysis is performed to test whether the image hash matches any known (or previously flagged) inappropriate image hashes. For example, an image hash analysis can be used to automatically and quickly identify image hashes for known pornography images. Such image hash identification provides an automated and scalable means for removing inappropriate images from further analysis and processing. Image hashing algorithms are described in greater detail in Venkatesan, et al., "Robust Image Hashing," IEEE Intn'l Conf. on Image Processing: ICIP (September 2000), which is incorporated herein by reference in its entirety.

A content-based filter 492 can then be applied to images that pass the hash-based filter 491. Within the content-based filter 492, image recognition algorithms and/or crowdsourcing protocols can be applied to review and analyze the context/content of the processed images. The content-based filter 492 may further include image pattern matching algorithms to automatically scan and detect image content based on metrics such as patter. As such, a pattern scan of the image can be performed to compare the pattern scan of the image against a database of known ineligible images. If the pattern scan of the image matches a pattern scan of a known ineligible image, then the image can be flagged as ineligible for hosting content. If the pattern scan of the image does not match a pattern scan of a known ineligible image, then the image can be submitted for further processing. The content-based filter 492 may further include text association analysis algorithms to detect metadata text and/or scrape the published page for associated text, clues, or hints of the image. As such, a comparison of the text association analysis of the image may be performed against a database of known ineligible images. If the text association analysis of the image matches a known ineligible image, then the image can be flagged as ineligible for hosting content. If the text association analysis of the image does not match a known ineligible image, then the image can be submitted for further processing. In other words, a content-based filter 492 serves as a means for checking and/or verifying the context/content of the image.

A relationship-based filter 493 may then be applied to images that pass both the hash-based filter 491 and/or the content-based filter 493. Within the relationship-based filter 493, publisher information (and/or other external data) can be used to determine whether the image is appropriate for hosting content. For example, there may be instances wherein the image itself is appropriate for hosting contextually relevant advertisements, but the publisher and/or platform may be deemed inappropriate. Such instances may include pornography dedicated websites and/or publishers with negative "trust scores," ratings, or controversial reputations. Merchants, for example, may not wish to associate their advertisements with such publishers, even if a particularly published image is otherwise appropriate.

Images that pass the quality assurance filter 490 are then submitted to an image-content matching engine 422, wherein the images may be subjected to one or more sub-protocols such as: algorithmic content matching 423; image recognition analysis 424 of the image; proximate text recognition 425 in search of contextual information of the image based on text published proximate to the image; submission of the image to a crowdsource network 426 to identify the context/content of the image and tag the image with relevant data/tags; a thematic tagging engine 427 to identify and tag the image with relevant data/tags, based on a pre-defined theme; publisher provided data analysis 429; and/or any combinations or equivalents thereof. Content (e.g., ads, apps, etc.) stored in a content database 432 can then be matched to appropriate images and sent to the digital content platform 410 for publication proximate to the image 412. For example, if quality assurance filter 490 deems the image 412 to be appropriate for hosting content, then when an end-user activates hotspot 414, the service provider 420 can provide contextually relevant content 462, 463, and 464, in a scrollable image frame 470 on the digital content platform 410.

FIG. 5 is a high-level schematic diagram of another embodiment of the present invention. The schematic of FIG.

5 is similar to that shown in FIG. 4, however, FIG. 5 illustrates an embodiment wherein the digital content platform 510 is a user-generated content (UGC) platform. Examples of UGC platforms include social networks, mobile applications, websites, etc., where users of the platform can upload, tag, comment, or otherwise modify images. As such, the users of the platform are in essence the "publishers" (a.k.a. "UGC publishers") of the images, despite not being owners/controllers of the platform. As such, the platform may include images provided by both appropriate and inappropriate publishers. Therefore, an extra layer of analysis is necessary to identify, track, and/or score the UGC publishers. In the embodiment shown in FIG. 5, usernames of the UGC publishers (e.g., "FashionShoes" in FIG. 5) are pulled from the digital content platform 510 in order to identify, track, and score the UGC publishers. Such information can be transmitted via an application programming interface (API) between the platform 510 and the service provider 520. The identity and score (e.g., trust score) of the UGC publisher can also be considered within the quality assurance filter 590 (and more specifically within the relationship-based filter 593). The content-based filter 592 may also consider any comments/edits performed by one or more UGC publishers on the image 512. If the image 512 and/or the UGC publisher clears the quality assurance filter 590, the image-content matching engine 522 can be used to match the image 512 to contextually relevant ads 562, content 563, and/or apps 555a, 555b, and 555c.

FIG. 6 is a flowchart illustrating a method 600, in accordance with one embodiment presented herein. In step 601, images are received from a plurality of source. Such sources can include a variety of digital content platforms, such as: websites, social networks, mobile applications, software applications, etc. In step 603, the images (or associated data, identifiers, etc.) are stored in an image database. In step 605, an image hash analysis is performed. A determination is made as to whether the image hash matches an image hash of a pre-flagged, inappropriate image. If so, the image is removed from the database and the source is flagged, in step 606. Once flagged, the source's trust score is considered and updated appropriately, in step 612. If a source's trust score drops below a pre-defined threshold, the source is removed from the input stream, in step 614.

However, images that pass the image hash analysis of step 605 are further subjected to an image content analysis, in step 607. Image content analysis may include various sub-protocols, as presented herein, including image recognition analysis and submission of the image to a crowdsource network for content analysis. If the image content analysis of step 607 determines that the image is appropriate for hosting ads/content, the image is forwarded to an image-content matching engine, in step 608. Sources providing appropriate images for hosting ads/content then have their trust score updated, in step 611.

If the image content analysis of step 607 determines that the image is inappropriate for hosting ads/content, the process continues with step 606 (as discussed above) and/or step 609. In step 609, a relationship test analysis is performed to determine whether the image content (and/or the source) violates pre-defined terms of service. The terms of service may include pre-defined agreements between the service provider and the various sources. If the terms of service have been violated, the process continues with step 606. However, if the terms of service have not been violated, the process may have a secondary check performed at step 610. For example, in step 610, a determination is made as to whether to reverse the decision (or flagging) of step 607. If not, the process may continue with step 606. However, if the decision (or flagging) of step 607 is reversed, the image can be sent to the image-content matching engine of step 608, and the source's trust score can be updated in step 611.

Additional Embodiments

In another embodiment, there is provided computer-implement systems and methods for selecting images eligible for hosting ads on a digital content platform; filtering images for inappropriate content; monitoring image content quality; policing publishers of digital content platforms; and/or ensuring image quality in an image analysis system. The embodiment includes pulling, receiving, or inputting a plurality of images, image identifiers, image location identifiers, and/or image URLs, from a plurality of digital content platforms (e.g., webpages, social networks, mobile/software applications, etc.). The embodiment includes filtering (or processing) the plurality of images through a first algorithmic filter to identify any ineligible images. The first algorithmic filter may include "machine learning" of publisher tendencies; a crawler function that adjusts depending on learning of publisher tendencies; a crawler function that identifies the image as inappropriate by matching the image to a pre-identified ineligible image; and/or an image hash function analysis. Ineligible images are the removed from further consideration. The publisher of the ineligible image may also be flagged for publisher review. The embodiment also includes storing the eligible images into a database and processing the images through a first content filter. The first content filter may be a "certified" crowdsource network member. Images deemed ineligible based on content are then flagged for processing through a second content filter. However, images deemed eligible based on content are submitted to an image-content (or image-ad) matching engine. The image-content (or image-ad) matching engine may include a crowdsourcing network for matching content/advertisements to images based on the context/content of the image. The embodiment further includes processing the flagged images through a second content filter, wherein images are analyzed to identify whether they violate pre-defined publisher terms of service. The second content filter can also: (1) analyze publisher metrics; (2) update a publisher's score/rating; (3) update a publisher's trust-ranking; and/or (4) flag the publisher for publisher review. If the second content filter identifies an image that violates pre-defined publisher terms of service, the publisher can be entirely removed from the system and their images may be removed from the image database. As such, removed publishers' images do not get processed by the system. The embodiment may further include performing a publisher review to identify publishers that should be re-enabled after being disabled/removed from the system.

In another embodiment, there is provided a method for identifying a digital content publisher to exclude from a computer-implemented image-advertisement matching system, wherein the image-advertisement matching system includes: (1) an image input cue for receiving a plurality of images from a plurality of digital content platforms; (2) one or more content filters for identifying images that are ineligible for hosting advertisements; and/or (3) a crowdsource network for matching at least one digital advertisement to a respective image. In practice, the digital advertisement is then provided proximate to the image on the digital content platform maintained by the digital content publisher. The method includes one or more of the steps of: (a) storing the images received in the image input cue in an image database; (b) processing images from the database through a first algorithmic filter to identify one or more ineligible images; (c) identifying the publisher of an ineligible image based on an algorithmic filter and flagging the publisher for publisher review; (d) processing the images from the database through a first content filter; (e) identifying the publisher of an ineligible image based on content and flagging the publisher for publisher review; (f) processing flagged images through a second content filter, wherein images are analyzed to identify whether they violate pre-defined publisher terms of service, wherein if the second content filter identifies an image that violates pre-defined publisher terms of service, the publisher is excluded from the image-advertisement matching system and their images are removed from the database; and/or (g) performing a publisher review to identify publishers that should be re-enabled after being excluded in step (f). The first algorithmic filter may include machine learning of publisher tendencies; a crawler function that adjusts depending on learning of publisher tendencies; a crawler function that identifies the image as inappropriate by matching the image to a pre-identified ineligible image; and/or an image hash algorithmic analysis. The first content filter may include crowdsource network for flagging ineligible images for further review, based on content. The second content filter may also (1) analyze publisher metrics; (2) update a publisher's score/rating; (3) update a publisher's trust-ranking; and/or (4) flag the publisher for publisher review.

In another embodiment, there is provided a computer-implemented method for selecting images eligible for hosting advertisements on a digital content platform. The method comprises: (a) using a computer-implemented image collection system to (1) identify an image published on a digital content platform, and (2) identify a publisher of the image; (b) using a computer-implemented image analysis system to (1) perform an image hash analysis on the image, and (2) assess the image against a database of known ineligible images based on the image hash analysis of step (b)(1). If the image matches a known ineligible image based on image hash, then the method includes flagging the image as ineligible for hosting advertisements on the digital content platform. If the image does not match a known ineligible image based on image hash, then the method includes submitting the image to a computerized crowdsource interface for performing an image content analysis of the image. The method further includes assessing the image content with a crowdsource network using the computerized crowdsource interface, wherein if the crowdsource network deems the image eligible for hosting advertisements on the digital content platform, then the image is automatically submitted to an image-advertisement matching engine, wherein the image is linked to a corresponding advertisement and the corresponding advertisement is sent to the digital content platform for publication proximate to the image on the digital content platform. If the crowdsource network deems the image ineligible for hosting advertisements on the digital content platform, then the image is flagged as ineligible for hosting advertisements and is automatically submitted to a relationship test analysis. The method further comprises: (c) performing the relationship test analysis by assessing whether the image violates a pre-defined publisher terms of service; and (d) updating a publisher score for the publisher identified in step (a)(2) based on the analysis of steps (b) and (c).

If the relationship test analysis of step (c) deems that the image does not violate the pre-defined publisher terms of service, step (c) further comprises: (1) removing the image flag applied in step (b); and (2) submitting the image to an image-advertisement matching engine, wherein the image is linked to a corresponding advertisement and the corresponding advertisement is sent to the digital content platform for publication proximate to the image on the digital content platform.

If the relationship test analysis of step (c) deems that the image does violate the pre-defined publisher terms of service, step (c) further comprises: (1) flagging the publisher identified in step (a)(2) as inappropriate for hosting advertisements.

In another embodiment, there is provide a computer-implemented system and method for a service provider to identify images eligible for hosting advertisements on a digital content platform. The system and method comprises: (a) using a computer-implemented image collection system to (1) identify an image published on a digital content platform, and (2) identify a publisher of the image; (b) using a computer-implemented image analysis system to assess content within the image, wherein if the image analysis system determines that the image is eligible for hosting advertisements, then the image is automatically submitted to an image-advertisement matching engine, wherein the image is linked to an advertisement, and wherein the advertisement is sent to the digital content platform for publication proximate to the image, and if the image analysis system determines that the image is ineligible for hosting advertisements, then the image is flagged as ineligible and is automatically submitted for relationship test analysis in step (c); and (c) performing a relationship test analysis by assessing whether the image violates a pre-defined service provider terms of service. The system and method further comprising: maintaining a publisher trust score; and updating the publisher trust score for the publisher identified in step (a)(2) based on the image analysis of step (b) or the relationship test analysis of step (c).

During or prior to step (b), the system and method may further comprise using a computer-implemented processing device to: (1) calculate an image hash of the image, and (2) compare the image hash against a database of known ineligible images, wherein if the image hash matches an image hash of a known ineligible image, then flagging the image as ineligible for hosting advertisements, and if the image hash does not match an image hash of a known ineligible image, then submitting the image for image analysis in step (b). The image analysis system may include a computerized crowdsource interface. Step (b) may be performed by displaying the image to a crowdsource network via the computerized crowdsource interface.

During or prior to step (b), the system and method may further comprise using a computer-implemented processing device to: (1) perform a pattern scan of the image, and (2) compare the pattern scan of the image against a database of known ineligible images. If the pattern scan of the image matches a pattern scan of a known ineligible image, then flagging the image as ineligible for hosting advertisements. If the pattern scan of the image does not match a pattern scan of a known ineligible image, then submitting the image for image analysis in step (b).

During or prior to step (b), the system and method may further comprise using a computer-implemented processing device to: (1) perform a text association analysis of the image, and (2) compare the text association analysis of the image against a database of known ineligible images. If the text association analysis of the image matches a known ineligible image, then flagging the image as ineligible for hosting advertisements. If the text association analysis of the image does not match a known ineligible image, then submitting the image for image analysis in step (b).

If the relationship test analysis of step (c) determines that the image does not violate the pre-defined service provider terms of service, the system and method may further comprise: removing the image flag applied in step (b); and submitting the image to the image-advertisement matching engine, wherein the image is linked to an advertisement, and wherein the advertisement is sent to the digital content platform for publication proximate to the image. If the relationship test analysis of step (c) determines that the image does violate the pre-defined publisher terms of service, the system and method may further comprise flagging the publisher identified in step (a)(2) as inappropriate for hosting advertisements.

In another embodiment, there is provide a computer-implemented system and method for a service provider to match images published on a digital content platform with contextually relevant advertisements. The system and method comprise: (a) using a computer-implemented image collection system to identify an image published on a digital content platform; (b) using a computer-implemented image analysis system to assess content within the image, wherein the image analysis system determines whether the image is eligible for hosting advertisements based on the content within the image; and if the image is eligible for hosting advertisements (c) using an image-advertisement matching engine to link a contextually relevant advertisement to the image; and (d) providing the contextually relevant advertisement to the digital content platform for publication proximate to the image. The digital content platform may be a website, mobile application, social network, or any equivalents thereof.

If the image is not eligible for hosting advertisements, the system and method my further comprise: flagging the image as ineligible for hosting advertisements; automatically submitting the image for relationship test analysis; and performing a relationship test analysis by assessing whether the image violates pre-defined terms. The system and method may further comprise using the computer-implemented image collection system to identify a publisher of the image. The system and method may further comprise: maintain a publisher trust score; and updating the publisher trust score based on the image analysis of step (b).

The system and method may further comprise: using a computer-implemented processing device to calculate an image hash of the image; and using the computer-implemented processing device to compare the image hash against a database of known ineligible images, wherein if the image hash matches an image hash of a known ineligible image, then flagging the image as ineligible for hosting advertisements.

The image analysis system may include a computerized crowdsource interface. Step (b) may be performed by displaying the image to a crowdsource network via the computerized crowdsource interface. Step (c) may be performed by displaying the image to a crowdsource network via the computerized crowdsource interface.

Communication Between Components/Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 7, below.

Computer Implementation.

Figure 7:
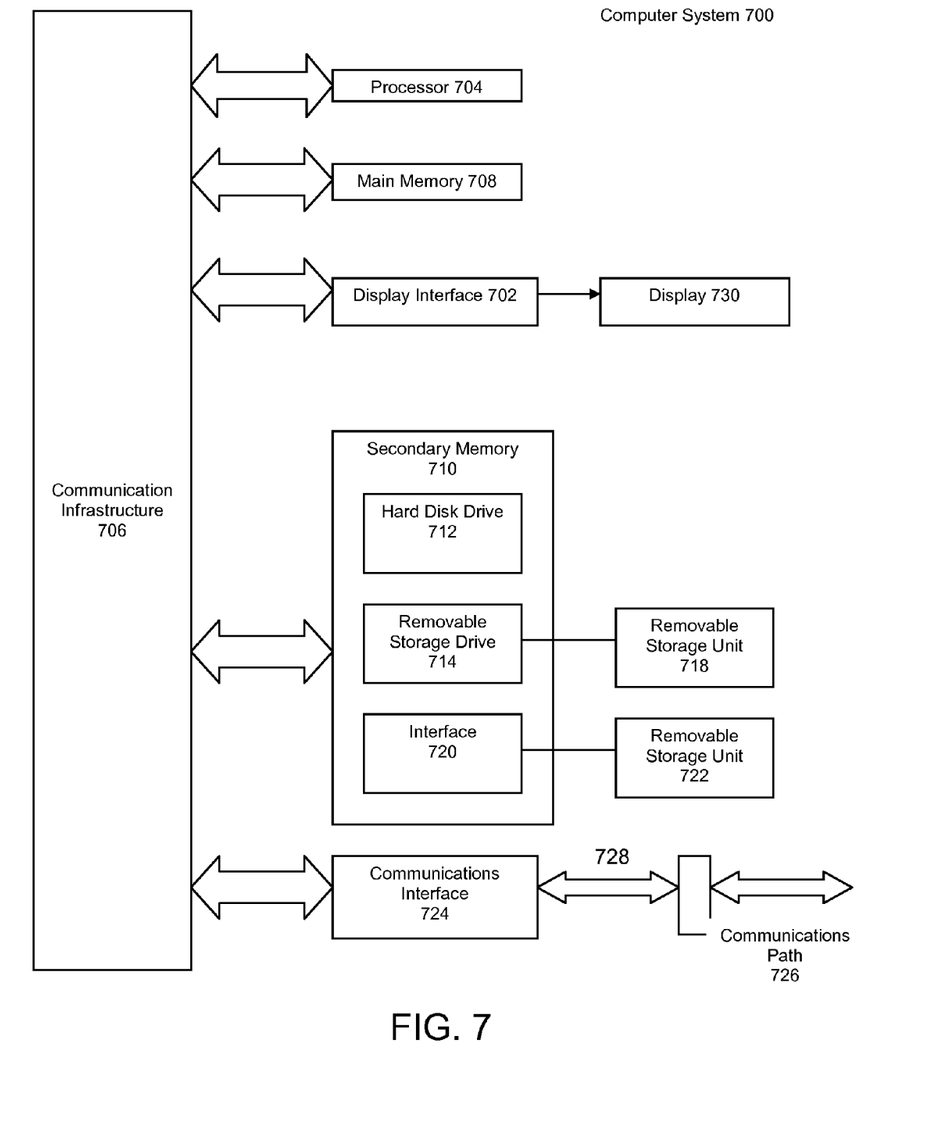
FIG. 7 is a schematic drawing of a computer system used to implement the systems and methods presented.

In one embodiment, the invention is directed toward one or more computer systems capable of carrying out the functionality described herein. For example, FIG. 7 is a schematic drawing of a computer system 700 used to implement the methods presented above. Computer system 700 includes one or more processors, such as processor 704. The processor 704 is connected to a communication infrastructure 706 (e.g., a communications bus, cross-over bar, or network). Computer system 700 can include a display interface 702 that forwards graphics, text, and other data from the communication infrastructure 706 (or from a frame buffer not shown) for display on a local or remote display unit 730.

Computer system 700 also includes a main memory 708, such as random access memory (RAM), and may also include a secondary memory 710. The secondary memory 710 may include, for example, a hard disk drive 712 and/or a removable storage drive 714, representing a floppy disk drive, a magnetic tape drive, an optical disk drive, flash memory device, etc. The removable storage drive 714 reads from and/or writes to a removable storage unit 718. Removable storage unit 718 represents a floppy disk, magnetic tape, optical disk, flash memory device, etc., which is read by and written to by removable storage drive 714. As will be appreciated, the removable storage unit 718 includes a computer usable storage medium having stored therein computer software, instructions, and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow computer software, instructions, and/or data to be transferred from the removable storage unit 722 to computer system 700.

Computer system 700 may also include a communications interface 724. Communications interface 724 allows computer software, instructions, and/or data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 714, removable storage units 718, 722, data transmitted via communications interface 724, and/or a hard disk installed in hard disk drive 712. These computer program products provide computer software, instructions, and/or data to computer system 700. These computer programs products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the presented methods. Accordingly, such computer programs represent controllers of the computer system 700. Where appropriate, the processor 704, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 700 using removable storage drive 714, interface 720, hard drive 712, communications interface 724, or equivalents thereof. The control logic (software), when executed by the processor 704, causes the processor 704 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, having instructions executable by at least one processing device that, when executed, cause the processing device to: (a) identify an image published on a digital content platform; (b) identify a publisher of the image; (c) assess content within the image to determine whether the image is eligible for hosting advertisements; (d) link a contextually relevant advertisement to the image, if the image is eligible for hosting advertisements; and (d) provide the contextually relevant advertisement to the digital content platform for publication proximate to the image.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

Accordingly, it is to be understood that this invention is not limited to particular embodiments described, and as such may vary. It is also to be understood that the terminology used herein is for the purpose of describing particular embodiments only, and is not intended to be limiting.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A computer-implemented method for a service provider to identify images eligible for hosting advertisements and third-party content on a digital content platform, the method comprising:
  (a) using a computer-implemented image collection system to identify an image published on a digital content platform;
  (b) using a computer-implemented image analysis system to
    (1) calculate an image hash of the image,
    (2) compare the image hash against a database of known ineligible images, wherein if the image hash matches an image hash of a known ineligible image, then flagging the image as ineligible for hosting advertisements and third-party content,
    (3) perform a pattern scan of the image,
    (4) compare the pattern scan of the image against a database of known ineligible images, wherein if the pattern scan of the image matches a pattern scan of a known ineligible image, then flagging the image as ineligible for hosting advertisements and third-party content,
  (5) perform a text association analysis of the image, and
  (6) compare the text association analysis of the image against a database of known ineligible images, wherein if the text association analysis of the image matches a known ineligible image, then flagging the image as ineligible for hosting advertisements and third-party content; and
  (c) if the image analysis system of step (b) does not flag the image as ineligible for hosting advertisements and third-party content, then the computer-implemented image analysis system automatically submits the image to an image-content matching engine, wherein the image is linked to an advertisement or third-party content, and wherein the advertisement or third-party content is sent to the digital content platform for publication proximate to the image.

2. A computer-implemented method for a service provider to identify images eligible for hosting advertisements and third-party content on a digital content platform, the method comprising:
  (a) using a computer-implemented image collection system to identify an image published on a digital content platform;
  (b) using a computer-implemented image analysis system to assess content within the image, wherein if the image analysis system determines that the image is eligible for hosting advertisements and third-party content, then the image is automatically submitted to an image-content matching engine, wherein the image is linked to an advertisement or third-party content, and wherein the advertisement or third-party content is sent to the digital content platform for publication proximate to the image, and if the image analysis system determines that the image is ineligible for hosting advertisements or third-party content, then the image is flagged as ineligible and is automatically submitted for relationship test analysis in step (c); and
  (c) performing a relationship test analysis by assessing whether the image violates a pre-defined service provider terms of service.

3. The method of claim 2, the method further comprising: maintaining a publisher trust score; and
updating the publisher trust score for a publisher of the image based on the image analysis of step (b) or the relationship test analysis of step (c).

4. The method of claim 2, wherein the third-party content is an in-image application.

5. The method of claim 2, wherein the advertisement or third-party content is displayed within the same pixel frame as the published image.

6. The method of claim 2, wherein the advertisement or third-party content is displayed within a separate image frame proximate to the published image.

7. The method of claim 2, wherein the image collection system includes a webpage script inserted into the digital content platform.

8. The method of claim 2, wherein the digital content platform is selected from the group consisting of: a webpage, a social network, a browser-based web application, a software applications, a mobile device application, and a TV widget.

9. The method of claim 2, wherein the image analysis system includes a computerized crowdsource interface.

10. The method of claim 9, wherein step (b) is performed by displaying the image to a crowdsource network via the computerized crowdsource interface.

11. A computer-implemented method for a service provider to match images published on a digital content platform with contextually relevant advertisements and third-party content, the method comprising:
  (a) using a computer-implemented image collection system to identify an image published on a digital content platform, wherein the image collection system includes a computer-executable code to pull the image from the digital content platform;
  (b) using a computer-implemented image analysis system to determine whether the image is eligible for hosting advertisements and third-party content by testing the image against a database of known ineligible images; and if the image is eligible for hosting advertisements and third-party content
  (c) using an image-content matching engine to identify a contextually relevant advertisement or third-party content for the image; and
  (d) providing the contextually relevant advertisement or third-party content to the digital content platform for publication proximate to the image.

12. The method of claim 11, wherein if the image is not eligible for hosting advertisements and third-party content, the method comprises:
flagging the image as ineligible for hosting advertisements and third-party content; automatically submitting the image for relationship test analysis; and
performing a relationship test analysis by assessing whether the image violates pre-defined terms.

13. The method of claim 11, further comprising:
using the computer-implemented image collection system to identify a publisher of the image.

14. The method of claim 13, further comprising:
maintaining a publisher trust score; and
updating the publisher trust score based on the image analysis of step (b).

15. The method of claim 11, wherein the third-party content is an in-image application.

16. The method of claim 11, wherein the advertisement or third-party content is displayed within the same pixel frame as the published image.

17. The method of claim 11, wherein the advertisement or third-party content is displayed within a separate image frame proximate to the published image.

18. The method of claim 11, wherein the digital content platform is selected from the group consisting of: a webpage, a social network, a browser-based web application, a software applications, a mobile device application, and a TV widget.

19. The method of claim 11, wherein the image analysis system includes a computerized crowdsource interface.

20. The method of claim 19, wherein step (b) is performed by displaying the image to a crowdsource network via the computerized crowdsource interface.

21. The method of claim 19, wherein step (c) is performed by displaying the image to a crowdsource network via the computerized crowdsource interface.

22. A non-transient computer readable storage medium, comprising: instructions executable by at least one processing device that, when executed, cause the processing device to
  (a) identify an image published on a digital content platform,
  (b) submit the image to an image-content analysis system to determine whether the image is eligible for hosting content, if the image-content analysis system determines that the image is eligible for hosting content, then (c) submit the image to an image-content matching system to identify a contextually relevant advertisement or third-party content for the image, and (d) provide the contextually relevant advertisement or third-party content to the digital content platform for publication proximate to the image.

23. The computer-readable storage medium of claim 22, further comprising:
instructions executable by at least one processing device that, when executed, cause the processing device to test the image against a database of known ineligible images.

24. The computer-readable storage medium of claim 22, further comprising:
instructions executable by at least one processing device that, when executed, cause the processing device to identify a publisher of the image.

25. The computer-readable storage medium of claim 24, further comprising:
instructions executable by at least one processing device that, when executed, cause the processing device to maintain a publisher trust score; and
update the publisher trust score for the publisher of the image based on the image-content analysis.

26. The computer-readable storage medium of claim 22, further comprising:
instructions executable by at least one processing device that, when executed, cause the processing device to display the advertisement or third-party content within the same pixel frame as the published image.

27. The computer-readable storage medium of claim 22, further comprising:
instructions executable by at least one processing device that, when executed, cause the processing device to display the advertisement or third-party content within a separate image frame proximate to the published image.

28. The computer-readable storage medium of claim 22, wherein the digital content platform is selected from the group consisting of: a webpage, a social network, a browser-based web application, a software applications, a mobile device application, and a TV widget.

29. The computer-readable storage medium of claim 22, further comprising:
instructions executable by at least one processing device that, when executed, cause the processing device to display the image to a crowdsource network via a computerized crowdsource interface.

30. The computer-readable storage medium of claim 22, wherein the third-party content is an in-image application.

* * * * *